US012691387B2

(12) United States Patent
Lin

(10) Patent No.: US 12,691,387 B2
(45) Date of Patent: Jul. 28, 2026

(54) FLYING DISC

(71) Applicant: Huazhi Zhao, Shenzhen (CN)

(72) Inventor: Haiqun Lin, Shenzhen (CN)

(73) Assignee: Huazhi Zhao, Shenzhen (CN)

( * ) Notice: Subject to any disclaimer, the term of this patent is extended or adjusted under 35 U.S.C. 154(b) by 155 days.

(21) Appl. No.: 18/610,641

(22) Filed: Mar. 20, 2024

(65) Prior Publication Data

US 2024/0252947 A1 Aug. 1, 2024

(30) Foreign Application Priority Data

Apr. 21, 2023 (CN) .......................... 202310441247.6

(51) Int. Cl.
| | |
|---|---|
| *A63H 33/18* | (2006.01) |
| *F21V 23/00* | (2015.01) |
| *F21V 23/04* | (2006.01) |
| *F21V 33/00* | (2006.01) |
| *A01K 15/02* | (2006.01) |
| *F21Y 115/10* | (2016.01) |

(52) U.S. Cl.
CPC ........... *A63H 33/18* (2013.01); *F21V 23/001* (2013.01); *F21V 23/0492* (2013.01); *F21V 33/0004* (2013.01); *A01K 15/025* (2013.01); *F21Y 2115/10* (2016.08)

(58) Field of Classification Search
CPC ...................................................... A63H 33/18
See application file for complete search history.

(56) References Cited

U.S. PATENT DOCUMENTS

| | | | | |
|---|---|---|---|---|
| 5,032,098 A * | 7/1991 | Balogh | .................. | A63H 33/18 |
| | | | | 473/588 |
| 5,319,531 A * | 6/1994 | Kutnyak | ................ | A63H 33/18 |
| | | | | 473/588 |
| 5,611,720 A * | 3/1997 | Vandermaas | .......... | A63B 65/10 |
| | | | | 446/485 |
| 6,783,421 B1 * | 8/2004 | Lopez | .................... | A63H 23/10 |
| | | | | 446/485 |
| 6,857,770 B2 * | 2/2005 | Moore | .................. | A63H 33/22 |
| | | | | 362/555 |
| 7,347,758 B2 * | 3/2008 | Moore | .................. | A63H 33/18 |
| | | | | 446/219 |
| 9,731,216 B2 | 8/2017 | Richardson et al. | | |
| 12,201,918 B2 * | 1/2025 | Ho | .......................... | A63H 33/22 |

(Continued)

FOREIGN PATENT DOCUMENTS

| | | |
|---|---|---|
| CN | 201969354 U | 9/2011 |
| CN | 106166390 A | 11/2016 |

*Primary Examiner* — Nicholas J. Weiss
(74) *Attorney, Agent, or Firm* — SHIMOKAJI IP

(57) ABSTRACT

A flying disc includes a disc body, a LED light assembly, a centrifugal switch, an electronic assembly, and a light guide. The electronic assembly and the centrifugal switch are installed on the disc body, the light guide is installed on the disc body, the LED light assembly is embedded in the light guide, the LED light assembly is configured to emit light to illuminate the light guide, the electronic assembly is electrically connected to the centrifugal switch and the LED light assembly respectively, and the LED light assembly is selectively to emit or not emit light by turn-on or turn-off of the centrifugal switch. The flying disc is applicable in various environments, the structure is simplified and the cost is reduced, and the use safety is ensured.

9 Claims, 6 Drawing Sheets

100

(56)          References Cited

U.S. PATENT DOCUMENTS

2006/0160457 A1*  7/2006  Moore ................... A63H 33/18
                                                          446/47
2018/0085680 A1*  3/2018  Adkins .................... A63H 5/00

* cited by examiner

100

100

$2 \begin{cases} 21 \\ 22 \end{cases}$

1

FLYING DISC

FIELD OF THE INVENTION

The present invention relates to the technical field of a flying disc, and particularly to a flying disc based on LED illumination with centrifugal switch control.

BACKGROUND OF THE INVENTION

As a popular sports toy, flying discs provide convenience for interaction between humans and/or pets. For example, when as a pet sports toy, flying discs having no lighting are difficult to be visually captured in dark or low-light environments. Some of them are built in with light strips for visibility at night. However, if a pet such as a dog bites at the light strips, it may harm the dog's teeth, affecting the safety and health of the pet. Additionally, the structure of the existing flying disc is complex, and it would be an important challenge on simplifying the structure and reducing the cost.

Therefore, there is an urgent need for an improved flying disc to address these issues.

SUMMARY OF THE INVENTION

The present invention aims to provide a flying disc that is luminous and applicable in various environments, thereby simplifying the structure and reducing the cost, and ensuring use safety when used as a pet toy.

To achieve the above objective, the present invention provides a flying disc including a disc body, a LED light assembly, a centrifugal switch, an electronic assembly, and a light guide. The electronic assembly and the centrifugal switch are installed on the disc body, the light guide is installed on the disc body, the LED light assembly is embedded in the light guide, the LED light assembly is configured to emit light to illuminate the light guide, the electronic assembly is electrically connected to the centrifugal switch and the LED light assembly respectively, and the LED light assembly is selectively to emit or not emit light depending on turn-on or turn-off of the centrifugal switch.

As a preferable embodiment, the light guide is a ring structure and installed on the disc body, and the light guide is arranged around a circumference of the disc body and curled inwardly from the circumference of the disc body.

As a preferable embodiment, the light guide is a TPU light guide.

As a preferable embodiment, the electronic assembly comprise a PCB board, a battery, and a wire, wherein the PCB board is installed on the disc body, the battery is installed on the PCB board, the centrifugal switch is installed on the PCB board, one end of the wire is connected to the PCB board, and another end of the wire is connected to the LED light assembly.

As a preferable embodiment, the battery is a lithium battery.

As a preferable embodiment, the LED light assembly comprises a first LED light and a second LED light which are both installed on the light guide, and the first LED light and the second LED light are configured to emit light to illuminate the light guide as a whole.

As a preferable embodiment, the first LED light and the second LED light are installed back to back on the light guide, and light emitting surfaces of the first LED light and the second LED light face outward.

2

As a preferable embodiment, at least two LED light assemblies are arranged, and the at least two LED light assemblies are installed spaced apart inside the light guide.

As a preferable embodiment, the disc body is a disc structure.

As a preferable embodiment, the electronic assembly is located in a middle of the disc body.

In comparison with the prior art, the beneficial effects of the present invention follow.

First, by setting the centrifugal switch to control the LED light assembly to emit light, the flying disc is luminous and visible in dark environments, thus the flying disc is applicable in various environments. The centrifugal switch instead of a traditional sensor structure such as an accelerometer sensor or a MCU is used, thus it's controllable to turn on the LED light assembly of the flying disc when the flying disc is in action, and turn off the LED light assembly when in stationary. In such a way, the circuit inside is simplified and the cost is reduced, and additionally the volume of control circuits is reduced.

Second, a light guide with simple structure is used instead of a light strip, thus the cost and the energy consumption are reduce, and meanwhile the illumination effect of the flying disc is maintained. With the help of the coordination between the LED light assembly and the light guide, and the LED light assembly uses a point light source, thus it's difficult for the pets to bite at the LED light assembly, ensuring the use safety and reliability.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
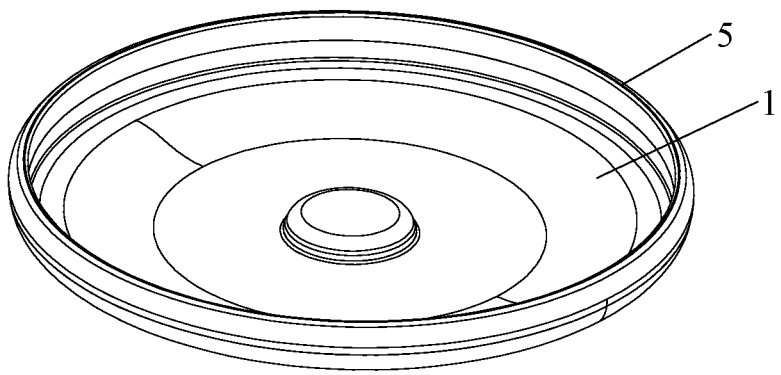
FIG. 1 is a perspective view of the flying disc according to the present invention.
Figure 2:
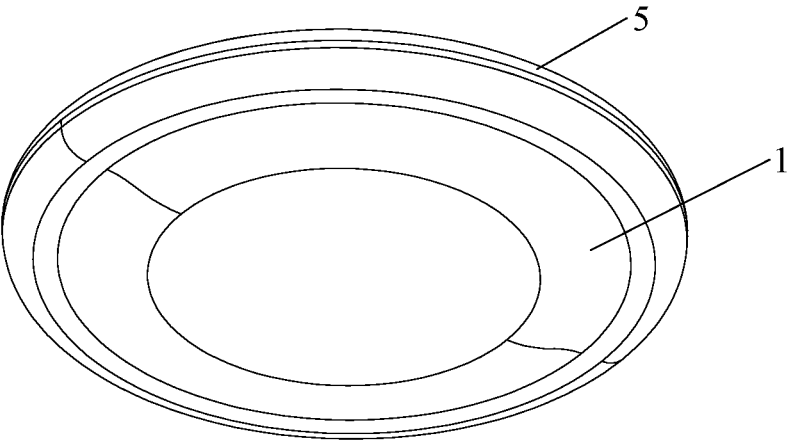
FIG. 2 is another perspective view of the flying disc according to the present invention.

The following will describe the technical solution of specific embodiments of the present invention in a clear and complete manner, based on the accompanying drawings. Obviously, the described embodiments are only part of the embodiments of the present invention, not all embodiments. Based on the embodiments of the present invention, all other embodiments obtained by those skilled in the art without creative labor are within the protection scope of the present invention, without departing from the spirit or basic characteristics of the present invention. Therefore, from any point of view, the embodiments should be considered as illustrative and not restrictive, and the scope of the invention is defined by the appended claims rather than the foregoing description, so all changes falling within the equivalent requirements of the claims should be included in the present invention. The terms used in the claims should not be construed as limiting the claims.

Referring to FIGS. 1 to 6, a flying disc 100 of the present invention includes a disc body 1, a LED light assembly 2, a centrifugal switch 3, an electronic assembly 4, and a light guide 5. The electronic assembly 4 and the centrifugal switch 3 are installed on the disc body 1. The disc body 1 is a disc structure. The electronic assembly 4 is installed on the disc body 1, the centrifugal switch 3 is installed on the electronic assembly 4, the light guide 5 is installed on the disc body 1, and the LED light assembly 2 is embedded in the light guide 5. The LED light assembly 2 is configured to emit light to illuminate the light guide 5. The electronic assembly 4 is electrically connected to the centrifugal switch 3 and the LED light assembly 2 respectively, and the LED light assembly 2 is selectively to emit or not emit light depending on the turn-on and turn-off of the centrifugal switch 3. The overall structure is simple, and the cost is low for easy promotion of the product.

Figure 3:
FIG. 3 is an exploded view of the flying disc according to the present invention.
Figure 3:
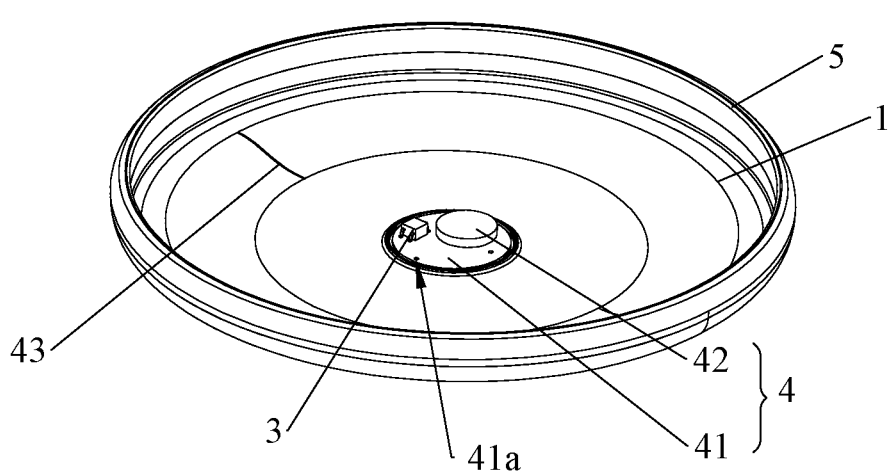
Figure 4:
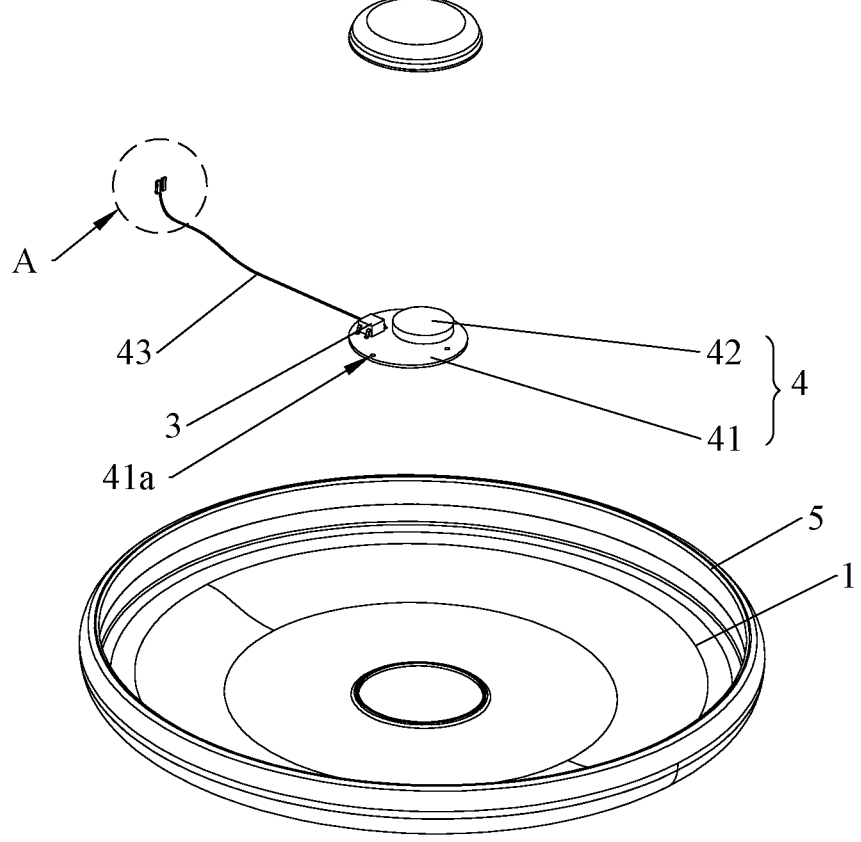
FIG. 4 is another exploded view of the flying disc according to the present invention.

More specifically, referring to FIGS. 3 to 4, the light guide 5 is a ring structure and installed on the disc body 1, arranged around a circumference of the disc body 1, and curled inwardly from the circumference of the disc body 1. Preferably, the light guide 5 is a TPU light guide, which is not limited however. The edge of the flying disc uses transparent TPU light guide, so that the light emitting the LED light assembly 2 may pass through the TPU light guide Referring to FIGS. 4 to 5, the electronic assembly 4 includes a PCB board 41, a battery 42, and a wire 43. The PCB board 41 is installed on the disc body 1. Specifically, the PCB board 41 is provided with mounting holes 41a for installation. The PCB board 41 is installed on the disc body 1 by the cooperation of screws and the mounting holes. The battery 42 is installed on the PCB board 41, and the centrifugal switch 3 is installed on the PCB board 41. One end of the wire 43 is connected to the PCB board 41, and the other end of the wire 43 is connected to the LED light assembly 2. Preferably, the battery 42 is a lithium battery, which is not limited however.

Figure 5:
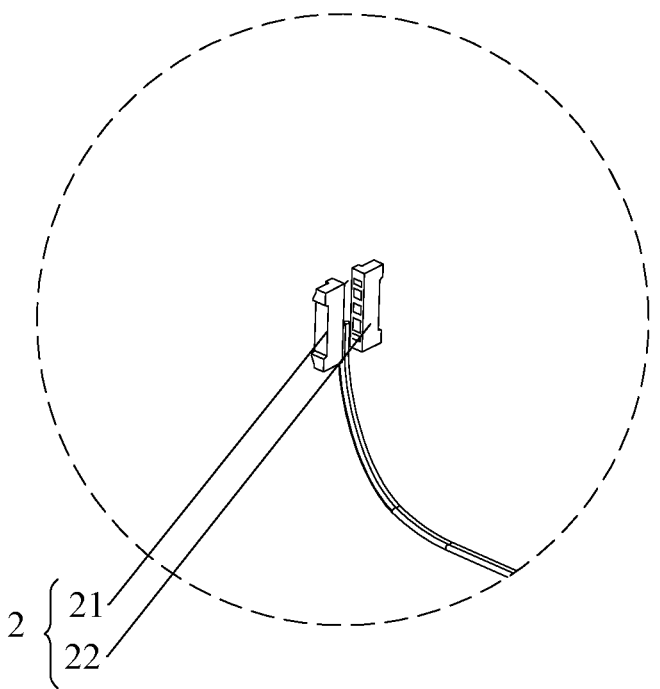
FIG. 5 is a partial enlarged view of portion A in FIG. 4.
Figure 6:
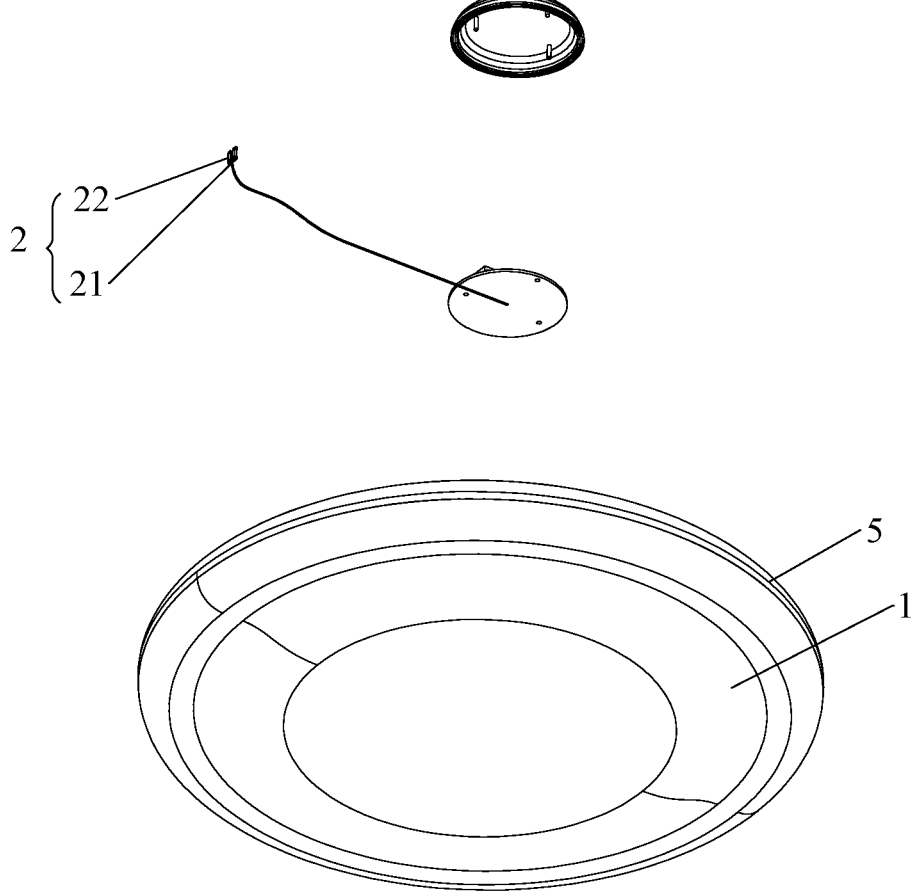
FIG. 6 is another exploded view of the flying disc according to the present invention.

Referring to FIGS. 4 to 5, the LED light assembly 2 includes a first LED light 21 and a second LED light 22 which are installed on the light guide 5, and configured to emit light to illuminate the light guide 5. Specifically, the first LED light 21 and the second LED light 22 are installed back to back on the light guide 5, so that the light emitting surface of the first LED light 21 and the light emitting surface of the second LED light 22 face outward. Preferably, at least two LED light assemblies 2 are provided, which are installed at intervals inside the light guide 5. The LED light assembly 2 is installed along the circumference of the flying disc, and each LED light assembly 2 is composed of the first LED light 21 and second LED light 22 installed back to back. Note, the number of the LED light assembly 2 is dependent on the perimeter of the flying disc 100 and the light guide effect, which may be 1, 2, or 3, etc.

Referring to FIGS. 1 to 6, the disc body 1 is a disc structure, and the electronic assembly 4 is located in the middle of the disc body 1, therefore the overall force of the disc body 1 is uniform.

In the present invention, for example, the flying disc may be used as a Frisbee for pets, which is not limited here however.

Referring to FIGS. 1 to 6, a detailed description of the operation process of the flying disc 100 of the present invention follows.

When the flying disc 100 is thrown out, the centrifugal switch 3 is triggered since the flying disc accelerates, namely the centrifugal switch 3 is turned on, accordingly the first LED light 21 and the second LED light 22 of the LED light assembly 2 emit light, causing the TPU light guide 5 to illuminate, so that the flying disc may be captured based on the illumination. Once the flying disc is caught and stopped, the centrifugal switch 3 is turned off and will not be triggered at this time, so that the first LED light 21 and the second LED light 22 of the LED light assembly 2 are turned off, and the TPU light guide 5 loses brightness.

Compared with the prior art, the beneficial effects of the present invention follow.

First, by setting the centrifugal switch 3 to control the LED light assembly 2 to emit light, the flying disc 100 is luminous and visible in dark environments, thus the flying disc 100 is applicable in various environments. The centrifugal switch 3 instead of a traditional sensor structure such as an accelerometer sensor or a MCU is used, thus it's controllable to turn on the LED light assembly 2 of the flying disc 100 when the flying disc 100 is in action, and turn off the LED light assembly 2 when in stationary. In such a way, the circuit inside is simplified and the cost is reduced, and additionally the volume of control circuits is reduced.

Second, a light guide 5 with simple structure is used instead of a light strip, thus the cost and the energy consumption are reduce, and meanwhile the illumination effect of the flying disc is maintained. With the help of the coordination between the LED light assembly 2 and the light guide 5, and the LED light assembly 2 uses a point light source, thus it's difficult for the pets to bite at the LED light assembly, ensuring the use safety and reliability.

The above-mentioned embodiments only represent several embodiments of the present invention, and the descriptions thereof are relatively specific and detailed, but should not be construed as limiting the scope of the patent invention. It should be pointed out that for those skilled in the art, several modifications and improvements can be made without departing from the concept of the present invention, which all belong to the protection scope of the present invention. Therefore, the scope of protection of the patent of the present invention shall be subject to the appended claims.

What is claimed is:

1. A flying disc, comprising a disc body, a LED light assembly, a centrifugal switch, an electronic assembly, and a light guide, wherein the electronic assembly and the centrifugal switch are installed on the disc body, the light guide is installed on the disc body, the LED light assembly is embedded in the light guide, the LED light assembly is configured to emit light to illuminate the light guide, the electronic assembly is electrically connected to the centrifugal switch and the LED light assembly respectively, and the LED light assembly is selectively to emit or not emit light depending on turn-on or turn-off of the centrifugal switch;

wherein the disc body is an integrated body, the light guide is integrally formed with the disc body and curled inwardly from a circumference of the disc body;

wherein the LED light assembly comprises a first LED light and a second LED light installed back to back on the light guide, and light emitting surfaces of the first LED light and the second LED light face outward.

2. The flying disc according to claim 1, wherein the light guide is a ring structure and installed on the disc body, and the light guide is arranged around a circumference of the disc body and curled inwardly from the circumference of the disc body.

3. The flying disc according to claim 1, wherein the light guide is a TPU light guide.

4. The flying disc according to claim 1, wherein the electronic assembly comprise a PCB board, a battery, and a wire, wherein the PCB board is installed on the disc body, the battery is installed on the PCB board, the centrifugal switch is installed on the PCB board, one end of the wire is connected to the PCB board, and another end of the wire is connected to the LED light assembly.

5. The flying disc according to claim 4, wherein the battery is a lithium battery.

6. The flying disc according to claim 1, wherein the first LED light and the second LED light which are both installed on the light guide, and the first LED light and the second LED light are configured to emit light to illuminate the light guide as a whole.

7. The flying disc according to claim 6, wherein at least two LED light assemblies are arranged, and the at least two LED light assemblies are installed spaced apart inside the light guide.

8. The flying disc according to claim 1, wherein the disc body is a disc structure.

9. The flying disc according to claim 1, wherein the electronic assembly is located in a middle of the disc body.

\* \* \* \* \*